US010891337B2

United States Patent
Makino

(10) Patent No.: US 10,891,337 B2
(45) Date of Patent: Jan. 12, 2021

(54) CONTENT ADDRESSABLE MEMORY AND SEMICONDUCTOR DEVICE

(71) Applicant: Renesas Electronics Corporation, Tokyo (JP)

(72) Inventor: Tsutomu Makino, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 40 days.

(21) Appl. No.: 16/270,772

(22) Filed: Feb. 8, 2019

(65) Prior Publication Data

US 2019/0171674 A1 Jun. 6, 2019

Related U.S. Application Data

(62) Division of application No. 14/713,691, filed on May 15, 2015, now Pat. No. 10,242,124.

(30) Foreign Application Priority Data

May 26, 2014 (JP) ................................. 2014-108100

(51) Int. Cl.
*G06F 16/903* (2019.01)
*G06F 12/02* (2006.01)
*H04L 12/743* (2013.01)
*G06F 16/00* (2019.01)

(52) U.S. Cl.
CPC ........ *G06F 16/90339* (2019.01); *G06F 12/02* (2013.01); *G06F 12/0223* (2013.01); *G06F 16/00* (2019.01); *H04L 45/7457* (2013.01); *G06F 2212/1028* (2013.01); *G06F 2212/154* (2013.01); *G06F 2212/163* (2013.01); *Y02D 10/00* (2018.01)

(58) Field of Classification Search
None
See application file for complete search history.

(56) References Cited

U.S. PATENT DOCUMENTS

| | | | |
|---|---|---|---|
| 5,875,483 A | 2/1999 | Tremblay | |
| 6,148,364 A | 11/2000 | Srinivasan et al. | |
| 6,230,236 B1 | 5/2001 | Schultz et al. | |
| 2002/0122337 A1* | 9/2002 | Kanazawa | G11C 15/00 365/189.12 |
| 2005/0076035 A1 | 4/2005 | Lin et al. | |
| 2007/0244893 A1 | 10/2007 | Abdat | |
| 2010/0057954 A1 | 3/2010 | Teng | |

FOREIGN PATENT DOCUMENTS

| | | |
|---|---|---|
| JP | 09-288615 A | 11/1997 |
| JP | 2004-295967 A | 10/2004 |

* cited by examiner

*Primary Examiner* — Charles J Choi
(74) *Attorney, Agent, or Firm* — McDermott Will & Emery LLP

(57) ABSTRACT

In a memory, multiple pieces of entry data sorted in ascending or descending order are stored associated with addresses. With whole addresses for storing the multiple pieces of entry data as an initial search area, the search circuit repeatedly performs a search operation for comparing entry data stored in a central address of the search area with the search data, outputting the address as a search result in the case of a match, and narrowing the search area for the next search based on a magnitude comparison result in the case of a mismatch.

6 Claims, 13 Drawing Sheets

FIG. 2

| INPUT | | COMPARISON RESULT | OUTPUT | |
|---|---|---|---|---|
| MATCH | ADDRESS | | MATCH | ADDRESS |
| 0 | 7 | SMALL | 0 | 3 |
| | | LARGE | 0 | 11 |
| | | MATCH | 1 | 7 |

FIG. 3

| INPUT | | COMPARISON RESULT | OUTPUT | |
|---|---|---|---|---|
| MATCH | ADDRESS | | MATCH | ADDRESS |
| 0 | 3 | SMALL | 0 | 1 |
| | | LARGE | 0 | 5 |
| | | MATCH | 1 | 3 |
| 0 | 11 | SMALL | 0 | 9 |
| | | LARGE | 0 | 13 |
| | | MATCH | 1 | 11 |
| 1 | 7 | * | 1 | 7 |

FIG. 4

| INPUT | | COMPARISON RESULT | OUTPUT | |
|---|---|---|---|---|
| MATCH | ADDRESS | | MATCH | ADDRESS |
| 0 | 1 | SMALL | 0 | 0 |
| 0 | 1 | LARGE | 0 | 2 |
| 0 | 1 | MATCH | 1 | 1 |
| 0 | 5 | SMALL | 0 | 4 |
| 0 | 5 | LARGE | 0 | 6 |
| 0 | 5 | MATCH | 1 | 5 |
| 0 | 9 | SMALL | 0 | 8 |
| 0 | 9 | LARGE | 0 | 10 |
| 0 | 9 | MATCH | 1 | 9 |
| 0 | 13 | SMALL | 0 | 12 |
| 0 | 13 | LARGE | 0 | 14 |
| 0 | 13 | MATCH | 1 | 13 |
| 1 | 3 | * | 1 | 3 |
| 1 | 7 | * | 1 | 7 |
| 1 | 11 | * | 1 | 11 |

FIG. 5

| INPUT | | COMPARISON RESULT | OUTPUT | |
|---|---|---|---|---|
| MATCH | ADDRESS | | MATCH | ADDRESS |
| 0 | 0 | MATCH | 1 | 0 |
| | 2 | MATCH | 1 | 2 |
| | 4 | MATCH | 1 | 4 |
| | 6 | MATCH | 1 | 6 |
| | 8 | MATCH | 1 | 8 |
| | 10 | MATCH | 1 | 10 |
| | 12 | MATCH | 1 | 12 |
| | 14 | MATCH | 1 | 14 |
| | * | SMALL/LARGE | 0 | 15 |
| 1 | 1 | * | 1 | 1 |
| | 3 | * | 1 | 3 |
| | 5 | * | 1 | 5 |
| | 7 | * | 1 | 7 |
| | 9 | * | 1 | 9 |
| | 11 | * | 1 | 11 |
| | 13 | * | 1 | 13 |

| INPUT | | COMPARISON RESULT | OUTPUT | |
|---|---|---|---|---|
| MATCH | ADDRESS | | MATCH | ADDRESS |
| 0 | 15 | SMALL | 0 | miss hit |
| | | LARGE | 0 | miss hit |
| | | MATCH | 1 | 15 |
| 1 | 1~14 | * | 1 | 1~14 |

FIG. 9

| pipeline stage | BSRAM Number (W:write entry data/data0-7: search data) | | | | | | | |
|---|---|---|---|---|---|---|---|---|
| | 0 | 1 | 2 | 3 | 4 | 5 | 6 | 7 |
| 1st | W | | | | | | | data0 |
| 2nd | data1 | W | | | | | data0 | |
| 3rd | | data2 | W | | | data0 | | data1 |
| 4th | data2 | | data3 | W | data0 | | data1 | |
| 5th | | data3 | | data0<br>data4 | W | data1 | | data2 |
| 6th | data3 | | data0<br>data4 | | data1<br>data5 | W | data2 | |
| 7th | | data0<br>data4 | | data1<br>data5 | | data2<br>data6 | W | data3 |
| 8th | data0<br>data4 | | data1<br>data5 | | data2<br>data6 | | data3<br>data7 | W |

| ML | BG | RESULT |
|---|---|---|
| 0 | 0 | SMALL |
| 0 | 1 | LARGE |
| 1 | X (HiZ) | MATCH |

| ML | BG | RESULT |
|----|----|--------|
| 0  | 0  | SMALL  |
| 0  | 1  | LARGE  |
| 1  | 0  | MATCH  |

CONTENT ADDRESSABLE MEMORY AND SEMICONDUCTOR DEVICE

CROSS-REFERENCE TO RELATED APPLICATIONS

This application is a divisional of U.S. patent application Ser. No. 14/713,691, filed May 15, 2015, which claims priority to Japanese Patent Application No. 2014-108100, filed May 26, 2014, the contents of all of which are incorporated herein by reference.

BACKGROUND

The present invention relates to a content addressable memory and a semiconductor device using the same, and is particularly suited to a content addressable memory with low power consumption.

Content addressable memories (CAM) are used in routers and network switches, and required to have larger capacity with increasing network traffic. In virtual networks implemented by the OpenFlow, one OpenFlow controller controls multiple open flow switches in a collective manner. CAMs incorporated in network devices such as OpenFlow switches are required to have large capacity, high-speed throughput, dynamic entry tables, low power consumption, and the like.

Japanese Unexamined Patent Publication No. 2004-295967 (Patent Document 1) discloses a CAM that implements the function of the magnitude comparison and range match comparison between data stored in a storage circuit and search data.

Japanese Unexamined Patent Publication No. Hei 9(1997)-288615 (Patent Document 2) discloses a cache memory device that can improve system efficiency by suppressing access to a main memory in the case of a conflict of or a succession of access to a plurality of memory entries of different tags allocated to the same cache entry.

SUMMARY

The present inventors have examined Patent Documents 1 and 2 and found the following problem. The CAM described in Patent Document 1 compares the search data with all stored data (entry data), which brings about large power consumption. In this specification, such a CAM is called a binary CAM which is abbreviated as BCAM.

While means for solving the problem will be described below, the other problems and novel features will become apparent from the description of this specification and the accompanying drawings.

One embodiment will be briefly described as follows.

A content addressable memory including a memory to which search data is inputted and which stores multiple pieces of entry data and a search circuit for searching for an address in the memory which stores entry data that matches the search data is configured as follows. In the memory, the multiple pieces of entry data sorted in ascending or descending order are stored associated with addresses. With the whole of the addresses of the memory as an initial search area, the search circuit repeatedly performs a search operation for comparing entry data stored in a central address of the search area with the search data, outputting the address as a search result in the case of a match, and narrowing the search area for the next search based on a magnitude comparison result in the case of a mismatch.

An effect obtained by the one embodiment will be briefly described as follows.

It is possible to provide the CAM with low power consumption.

BRIEF DESCRIPTION OF THE DRAWINGS

FIG. 2 is an explanation diagram showing an operation example of a comparison circuit 3_1 in the CAM shown in FIG. 1.

FIG. 3 is an explanation diagram showing an operation example of a comparison circuit 3_2 in the CAM shown in FIG. 1.

FIG. 4 is an explanation diagram showing an operation example of a comparison circuit 3_3 in the CAM shown in FIG. 1.

FIG. 5 is an explanation diagram showing an operation example of a comparison circuit 3_4 in the CAM shown in FIG. 1.

FIG. 9 is an explanation diagram showing an operation example of the CAM for performing the two-stage search.

DETAILED DESCRIPTION

1. Outline of Embodiments

Figure 1:
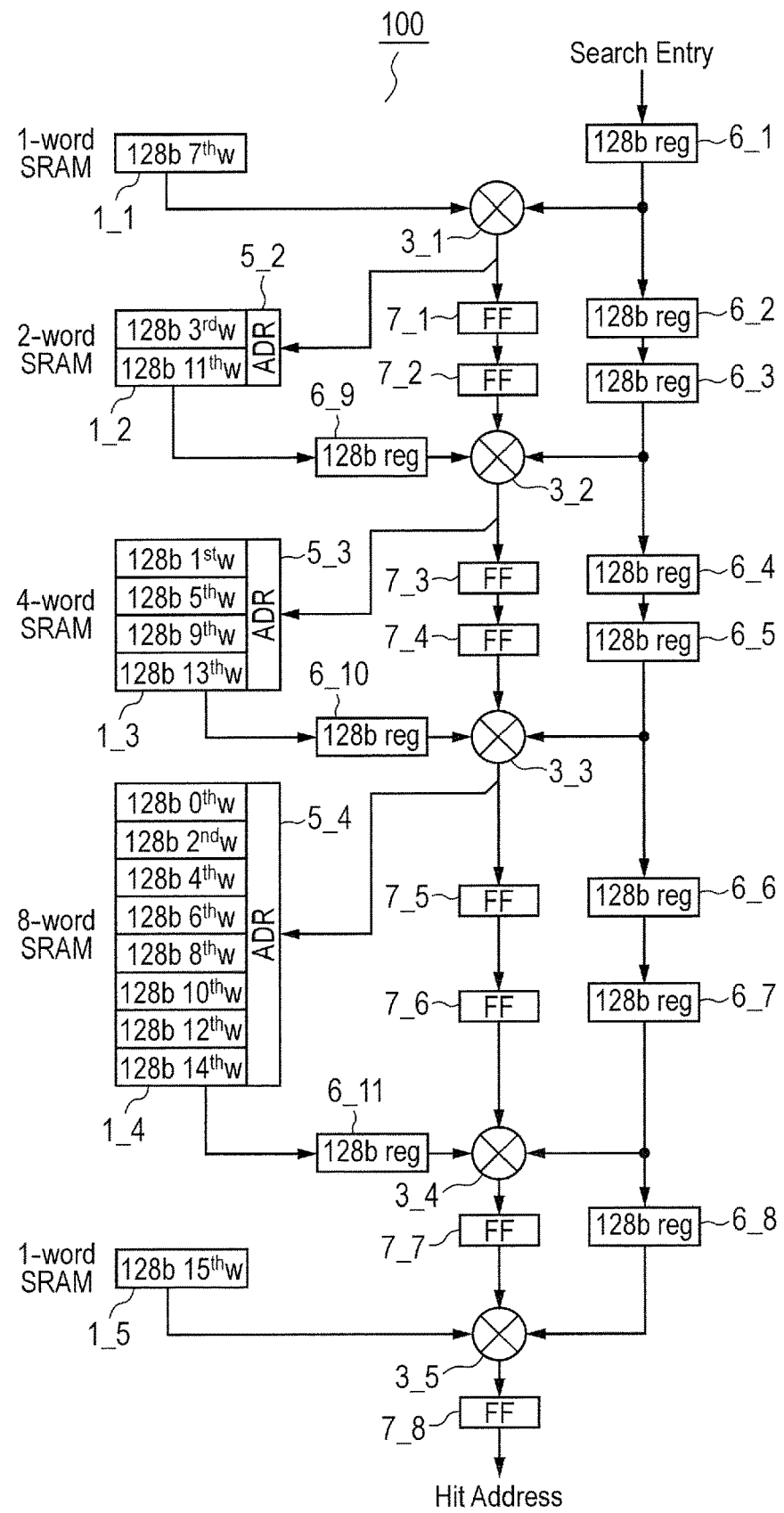
FIG. 1 is a block diagram showing a configuration example of a CAM for performing a binary search on SRAMs.

First, exemplary embodiments of the invention disclosed in the present application will be outlined. Reference numerals in the drawings that refer to with parentheses applied thereto in the outline description of the exemplary embodiments are merely illustration of ones contained in the concepts of components marked with the reference numerals.

[1] <Content Addressable Memory (CAM) for Performing Binary Search on SRAM>

A content addressable memory (CAM) (100) according to an exemplary embodiment disclosed in the present application includes a memory (1_1 to 1_5, 2_2 to 2_4) to which search data (Search Entry) is inputted and which stores multiple pieces of entry data and a search circuit (3_1 to 3_5, 4_1 to 4_5) for searching for an address in the memory which stores entry data that matches the search data.

In the memory, the multiple pieces of entry data are sorted in ascending or descending order and can be stored associated with addresses.

With whole addresses (0thw to 15thw) for storing the multiple pieces of entry data as an initial search area, the search circuit repeatedly performs a search operation for comparing entry data stored in a central address (7thw, . . . ) of the search area with the search data, outputting the address as a search result in the case of a match, and narrowing the search area based on a magnitude comparison result in the case of a mismatch.

Thereby, in each search area, only one piece of entry data stored in the central address of each search area is subject to comparison with the search data. Accordingly, the number of pieces of entry data to be compared is suppressed to the logarithm ($\log_2 2^N = N$) of the total number ($2^N$) of pieces of entry data, thus making it possible to provide the content addressable memory with low power consumption. In this context, the "central" address of the search area does not mean the mathematically precise ½, but can be roughly the center. For example, the central address of 16 entries may be the seventh or eighth address. Although the central address may be further deviated, the closer it is to the precise ½, the smaller the number of steps required for searches (the number of above-described repeats), i.e., the number of comparisons.

Hereinafter, the word "central" in this specification is defined in the same manner.

[2] <Pipeline Configuration>

In item 1, the memory has first to Nth memories (1_1 to 1_4) (N is a natural number) each having power-of-two words ranging from one word to 2 to the (N−1)th power, each word being associated with the central address of the search area. The search circuit has first to Nth comparison circuits (3_1 to 3_4) provided corresponding to the first to Nth memories.

Each comparison circuit reads entry data from a corresponding memory, compares the entry data with the search data, and outputs an address for storing the entry data and a comparison result to a comparison circuit in a subsequent stage. Each comparison circuit determines an address for reading entry data to be compared, based on the address and the comparison result inputted from a preceding stage.

Thereby, the CAM for performing the binary search can be configured by a pipeline, so that throughput can be improved.

[3] <CAM with (2 to the Nth Power) Entries>

In item 2, the memory further has an (N+1)th memory (1_5) of one word having an address of (2 to the Nth power−1). The search circuit further has an (N+1)th comparison circuit (3_5) for comparing the search data with entry data stored in the (N+1)th memory, based on a comparison result inputted from the Nth comparison circuit.

This makes it possible to provide the CAM having the number of entries of power-of-two ($2^N$) words.

[4] <Content Addressable Memory for Performing Two-Stage Search>

In item 1, a first content addressable memory (BSRAM, 100) has the same configuration as the content addressable memory. The content addressable memory (500) for performing a two-stage search further includes a second content addressable memory (BCAM, 200) having the same number of entries as the first content addressable memory, a plurality of first content addressable memories (100_1 to 100_*m*), and a transfer circuit (900) for reading multiple pieces of entry data from the second content addressable memory, sorting the multiple pieces of entry data in ascending or descending order, and transferring the sorted multiple pieces of entry data to the first content addressable memory.

Thereby, a hit in the second content addressable memory functioning as a search cache leads to a small latency, and in the case of no hit, the first content addressable memories are sequentially searched, thereby making it possible to provide the CAM with a large capacity but low power consumption.

[5] <Two Search Caches>

In item 4, the content addressable memory (500) includes two second content addressable memories (200_1, 200_2). When one transfers entry data to the first content addressable memory, the other is subject to writing of new entry data.

This makes it possible to write new entry data without waiting. During a period when one second content addressable memory transfers entry data to the first content addressable memory, new entry data cannot be written to the second content addressable memory that is transferring entry data. However, if a request to write new entry data arises during the period, new entry data can be written to the other second content addressable memory that is not transferring entry data.

[6] <Search Order>

In item 4 or 5, in the content addressable memory (500), when the search data is inputted, the second content addressable memory is searched first, and in the case of no hit in the second content addressable memory, the first content addressable memories are searched in reverse chronological order of writing of entry data.

This can reduce the time to a hit.

[7] <CAM with Sort Function>

In item 4 or 5, the second content addressable memory is comprised of a memory cell (10) having a match/magnitude comparison function, and further has a priority storage circuit (9_1 to 9_N) for obtaining and storing priorities corresponding to multiple pieces of input entry data, based on a result of comparing input entry data with each entry data that has been inputted. The transfer circuit reads the multiple pieces of entry data in association with the priorities, sorts the multiple pieces of entry data, and transfers the sorted multiple pieces of entry data to the first content addressable memory.

This can reduce the time required to sort entry data.

[8] <Parallel Input of Multiple Pieces of Search Data>

In item 1, the memory (2_2 to 2_4) has a plurality of ports for simultaneously reading data from different words by a plurality of addresses, and the content addressable memory includes the search circuit (3_1 to 3_5, 4_1 to 4_5) in parallel for each port.

This makes it possible to simultaneously and parallelly input and search for multiple pieces of search data (Search Entry 1 and Search Entry 2).

[9] <Semiconductor Device>

A semiconductor device includes a content addressable memory according to any one of items 1 to 8 over a single semiconductor substrate.

This can reduce the power consumption of the CAM-integrated semiconductor device.

[10] <Content Addressable Memory (CAM) for Performing Binary Search on SRAM>

A content addressable memory according to an exemplary embodiment disclosed in the present application is a content addressable memory (CAM) (100) which can store (2 to the Nth power) pieces of entry data (N is a natural number) and searches for entry data that matches input search data (Search Entry).

The content addressable memory includes first to Nth memories (1_1 to 1_4) each having power-of-two words ranging from one word to 2 to the (N−1)th power, an (N+1)th memory (1_5) of one word, and first to (N+1)th comparison circuits (3_1 to 3_5) provided corresponding to the first to (N+1)th memories.

The first comparison circuit reads entry data from the first memory, performs a match/magnitude comparison with the search data, and outputs a comparison result to the second comparison circuit.

The second comparison circuit (3_2) reads entry data stored in an address (3rdw or 11thw) of the second memory calculated based on the comparison result inputted from the first comparison circuit, performs a match/magnitude comparison with the search data, and outputs a comparison result to the third comparison circuit (3_3).

The third to Nth comparison circuits (3_3 to 3_4) determine an address for reading entry data to be compared, based on an address for storing entry data compared by a comparison circuit in a preceding stage and a comparison result inputted from the preceding stage, read entry data from a corresponding memory, perform a match/magnitude comparison with the search data, and output a comparison result to a comparison circuit in a subsequent stage.

The (N+1)th comparison circuit (3_5) performs a comparison as to whether or not the search data matches entry data stored in the (N+1)th memory (1_5).

If there exists entry data that matches the search data, based on a number of a memory that stores the matched entry data and an address in the memory that stores the matched entry data, the (N+1)th comparison circuit calculates and outputs what number entry data matches the search data in a state where the (2 to the Nth power) pieces of entry data are sorted.

Thereby, in each search area, only one piece of entry data stored in the central address of each search area is subject to comparison with the search data. Accordingly, the number of pieces of entry data to be compared is suppressed to the logarithm ($\log_2 2^N = N$) of the total number ($2^N$) of pieces of entry data, thus making it possible to provide the content addressable memory with low power consumption.

[11] <Storage of Sorted Entry Data>

In item 10, the first memory stores (2 to the (N−1)th power)th data out of the (2 to the Nth power) pieces of entry data, and the (N+1)th memory stores (2 to the Nth power)th data out of the (2 to the Nth power) pieces of entry data.

The ith memory (i is a natural number equal to or greater than 2 and less than N) stores entry data, other than entry data stored in the first to (i−1)th memories, out of (j×2 to the (N−1)th power)th entry data (j is all natural numbers less than 2 to the ith power).

If there exists entry data that matches the search data, the content addressable memory outputs (j×2 to the (N−1)th power−1) corresponding to the matched entry data.

Thereby, entry data is sorted and stored, and the priority of entry data that matches the search data is outputted as a storage address.

[12] <Pipeline Configuration>

In item 11, the first to (N+1)th comparison circuits sequentially operate on the same search data in different pipeline stages.

Thereby, the CAM for performing the binary search can be configured by a pipeline, so that throughput can be improved.

[13] <Content Addressable Memory for Performing Two-stage Search>

In item 11, a first content addressable memory (BSRAM, 100) has the same configuration as the content addressable memory. The content addressable memory (500) for performing a two-stage search further includes a second content addressable memory (BCAM, 200) having the same number of entries as the first content addressable memory, a plurality of first content addressable memories (100_1 to 100_m), and a transfer circuit (900) for reading multiple pieces of entry data from the second content addressable memory, sorting the multiple pieces of entry data in ascending or descending order, and transferring the sorted multiple pieces of entry data to the first content addressable memory.

Thereby, a hit in the second content addressable memory functioning as a search cache leads to a small latency, and in the case of no hit, the first content addressable memories are sequentially searched, thereby making it possible to provide the CAM with a large capacity but low power consumption.

[14] <Two Search Caches>

In item 13, the content addressable memory (500) includes two second content addressable memories (200_1, 200_2). When one transfers entry data to the first content addressable memory, the other is subject to writing of new entry data.

This makes it possible to write new entry data without waiting. During a period when one second content addressable memory transfers entry data to the first content addressable memory, new entry data cannot be written to the second content addressable memory that is transferring entry data. However, if a request to write new entry data arises during the period, new entry data can be written to the other second content addressable memory that is not transferring entry data.

[15] <Search Order>

In item 13 or 14, in the content addressable memory (500), when the search data is inputted, the second content addressable memory is searched first, and in the case of no hit in the second content addressable memory, the first content addressable memories are searched in reverse chronological order of writing of entry data.

This can reduce the time to a hit, and by not performing searches after the hit, the power consumption can be reduced.

[16] <CAM with Sort Function>

In item 13 or 14, the second content addressable memory is comprised of a memory cell (10) having a match/magnitude comparison function, and further has a priority storage circuit (9_1 to 9_N) for obtaining and storing priorities corresponding to multiple pieces of input entry data, based on a result of comparing input entry data with each entry data that has been inputted. The transfer circuit reads the multiple pieces of entry data in association with the priorities, sorts the multiple pieces of entry data, and transfers the sorted multiple pieces of entry data to the first content addressable memory.

This can reduce the time required to sort entry data.

[17] <Parallel Input of Multiple Pieces of Search Data>

In item 11, the second to Nth memories each have a plurality of ports for simultaneously reading data from different words by a plurality of addresses, and the content addressable memory includes the search circuit (4_1 to 4_5) in parallel for each port.

This makes it possible to simultaneously and parallelly input and search for multiple pieces of search data.

[18] <Semiconductor Device>

A semiconductor device includes a content addressable memory according to any one of items 10 to 17 over a single semiconductor substrate.

This can reduce the power consumption of the CAM-integrated semiconductor device.

2. Details of Embodiments

Embodiments will be described in greater detail below.

First Embodiment

<CAM for Performing Binary Search on SRAM>

A content addressable memory (CAM) according to an exemplary embodiment disclosed in the present application includes a memory to which search data (Search Entry) is inputted and which stores multiple pieces of entry data and a search circuit for searching for an address in the memory which stores entry data that matches the search data. In the memory, the multiple pieces of entry data are sorted in ascending or descending order and stored associated with respective addresses. For example, in the case where the memory is comprised of $2^N$ words, $2^N$ pieces of entry data are sorted in ascending order; therefore, entry data having a minimum value is stored in 0w (word), and entry data having a maximum value is stored in $2^N-1w$. The memory is, e.g., an SRAM (Static Random Access Memory), and may be one large-capacity SRAM that can store all entry data; however, preferably the memory is divided into a plurality of SRAMs having respective appropriate numbers of words, as described later. This can improve performance by configuring a pipeline with each SRAM as a pipeline step. Alternatively, another storage device having an equivalent function may be used.

With whole addresses 0w to $2^N-1w$ for storing the multiple pieces of entry data as an initial search area, the search circuit compares entry data stored in a central address $2^{N-1}-1w$ of the search area with the search data (Search Entry). The search circuit outputs the address ($2^{N-1}-1w$) as a search result in the case of a match, and narrows the search data based on a magnitude comparison result in the case of a mismatch. That is, if the search data (Search Entry) is smaller than the entry data stored in the central address $2^{N-1}-1w$ of the search area, the next search area is changed to an area 0w to $2^{N-1}-2w$ smaller than the central address $2^{N-1}-1w$. If the search data is larger than the entry data, the next search area is changed to an area $2^{N-1}w$ to $2^N-1w$ larger than the central address $2^{N-1}-1w$. As in this example, preferably the search area is narrowed to ½ in each repetitive step.

Then, the search circuit compares entry data stored in a central address of the changed (narrowed) search area with the search data (Search Entry). That is, if the search area is changed to the area 0w to $2^{N-1}-2w$ in the preceding stage, the search circuit compares the entry data stored in the central address $2^{N-2}-1w$ with the search data (Search Entry). If the search area is changed to the area $2^{N-1}w$ to $2^N-1w$ in the preceding stage, the search circuit compares the entry data stored in the central address $3\times2^{N-2}-1w$ with the search data (Search Entry).

The search circuit repeats this operation until the search area cannot be divided. The search circuit outputs, as a hit address, the value of an address for storing entry data that matches the search data (Search Entry) in the process. If there is no entry data that matches the search data, the search circuit outputs "miss hit".

Thus, in each search area, only one piece of entry data stored in the central address of each search area is subject to comparison with the search data. Since the search circuit repeats comparison and search area change to search for entry data that matches the search data (Search Entry), N comparisons are enough even for the search of all areas. Accordingly, the number of pieces of entry data to be compared is suppressed to the logarithm ($\log_2 2^N$) of the total number ($2^N$) of pieces of entry data, thus making it possible to provide the content addressable memory with low power consumption.

Unlike the CAM in the related art, the above memory may be a simple RAM capable of data read/write by addressing, because the search circuit compares entry data with the search data (Search Entry). While the description has been made by way of example in which multiple pieces of entry data are sorted in ascending order and stored in order of memory address, the invention is not limited thereto as long as the sort method corresponds to the comparison method by the search circuit. In sorting/comparison of numerical values, the magnitude comparison may be performed on numerical values in complement representation or absolute values. Further, the magnitude comparison may be performed in some kind of order (e.g., alphabetical order) other than numerical order. Further, multiple pieces of entry data may have the same numerical value.

In the case where the number of pieces of entry data falls below the address area size (0w to $2^N-1w$ in the above example) of the memory, each entry data is assigned a valid flag for valid/invalid management, and invalid entry data is excluded from comparison. This makes it possible to search for the search data (Search Entry) in the case of small pieces of entry data as well. While the CAM according to each embodiment below may be assigned the valid flag, to facilitate the understanding of the configuration and operation of the entire CAM, the valid flag will not be described.

Hereinafter, a description will be made of a more specific configuration example of the CAM for performing a binary search on the SRAM, according to the first embodiment.

FIG. 1 is a block diagram showing a configuration example of the CAM for performing the binary search on the SRAM. In FIG. 1, N=4, and entry data is composed of 128 bits×16 words.

The memory is implemented divided into five SRAMs 1_1 to 1_5, configuring a pipeline as a whole. Input search data (Search Entry) is transferred to the subsequent pipeline stage in succession by a shift register comprised of 128-bit registers 6_1 to 6_8. The search circuit is comprised of comparison circuits 3_1 to 3_5 for comparing the search data (Search Entry) with entry data. The function of the comparison circuits 3_1 to 3_5 will be described later. Further, the 128-bit registers 6_1 to 6_8 and flip-flops (FF) 7_1 to 7_8 are provided for timing adjustment.

The first SRAM 1_1 is a 1-word SRAM, and only entry data of the 7th word (7thw) is stored therein. The SRAM 1_2 is a 2-word SRAM, and entry data of the 3rd word (3rdw) and entry data of the 11th word (11thw) are stored therein. The SRAM 1_3 is a 4-word SRAM, and entry data of the 1st word (1stw), entry data of the 5th word (5thw), entry data of the 9th word (9thw), and entry data of the 13th word (13thw) are stored therein. The SRAM 1_4 is an 8-word SRAM, and entry data of the 0th word (0thw), entry data of the 2nd word (2ndw), entry data of the 4th word (4thw), entry data of the 6th word (6thw), entry data of the 8th word (8thw), entry data of the 10th word (10thw), entry data of the 12th word (12thw), and entry data of the 14th word (14thw) are stored therein. The SRAM 1_5 is a 1-word SRAM, and only entry data of the 15th word (15thw) is stored therein. Since the SRAM 1_1 and the SRAM 1_5 are 1-word SRAMs, the addresses are not required, and the SRAMs 1_1 and 1_5 can be comprised of a simple register. In FIG. 1, each interconnection is comprised of 1 bit or a plurality of bits, but a bus is not shown.

The operation of the CAM shown in FIG. 1 will be described.

Sixteen pieces of entry data are sorted beforehand, e.g., in ascending order, and stored in the above-mentioned words of the five SRAMs 1_1 to 1_5. The larger entry data is stored in the word of the larger number. The largest entry data is stored in the 15th word (15thw) of the SRAM 1_5, and the smallest entry data is stored in the 0th word (0thw) of the SRAM 1_4. The 7th word (7thw) stored in the first SRAM 1_1 is the central address of the search area from the 0th word (0thw) to the 15th word (15thw).

The search data (Search Entry) is compared with the entry data of the 7th word (7thw) stored in the SRAM 1_1 by the comparison circuit 3_1. FIG. 2 is an explanation diagram showing an operation example of the comparison circuit 3_1. Since the comparison circuit 3_1 is in the first stage, the preceding comparison result "0" indicating a mismatch is inputted to the comparison circuit 3_1, and the address "7" of the entry data to be compared is inputted to the comparison circuit 3_1. The results of comparing the search data (Search Entry) with the entry data of the 7th word (7thw) inputted from the SRAM 1_1 are classified into three comparison results "small", "large", and "match". The comparison circuit 3_1 outputs "0" indicating a mismatch and the address "3" in the case of the comparison result "small", outputs "0" indicating a mismatch and the address "11" in the case of the comparison result "large", and outputs "1" indicating a match and the address "7" in the case of the comparison result "match". In the case of the comparison result "small", the search area is changed to a range of 0 to 6 smaller than the 7th word (7thw), and its central address "3" is outputted. In the case of the comparison result "large", the search area is changed to a range of 8 to 15 larger than the 7th word (7thw), and its central address "11" is outputted. Thus, as a result of one comparison, the search area is narrowed to ½, and the central address of the area to be searched is outputted to the next stage.

The address outputted from the comparison circuit 3_1 is inputted to the SRAM 1_2, and the entry data of the 3rd word (3rdw) or the 11th word (11thw) is read and supplied through a register 6_9 to the comparison circuit 3_2. The comparison result and the address outputted from the comparison circuit 3_1 are supplied through the flip-flops 7_1 and 7_2 to the comparison circuit 3_2. FIG. 3 is an explanation diagram showing an operation example of the comparison circuit 3_2. The preceding comparison result "1" indicating the match or "0" indicating the mismatch is inputted to the comparison circuit 3_2, and the address "3" or "11" of the entry data to be compared is inputted to the comparison circuit 3_2.

In the case of the address "3" input from the preceding stage, the entry data of the 3rd word (3rdw) is read from the SRAM 1_2, and is compared with the search data (Search Entry) by the comparison circuit 3_2. The comparison circuit 3_2 outputs "0" indicating the mismatch and the address "1" in the case of the comparison result "small", outputs "0" indicating the mismatch and the address "5" in the case of the comparison result "large", and outputs "1" indicating the match and the address "3" in the case of the comparison result "match".

In the case of the address "11" input from the preceding stage, the entry data of the 11th word (11thw) is read from the SRAM 1_2, and is compared with the search data (Search Entry) by the comparison circuit 3_2. The comparison circuit 3_2 outputs "0" indicating the mismatch and the address "9" in the case of the comparison result "small", outputs "0" indicating the mismatch and the address "13" in the case of the comparison result "large", and outputs "1" indicating the match and the address "11" in the case of the comparison result "match".

In the case of the comparison result "match" and the address "7" input from the preceding stage, the comparison circuit 3_2 outputs the comparison result "1" indicating "match" and the address "7" as they are.

Thus, as a result of the second comparison, the search area is further narrowed to ½, that is, ¼ of the whole, and the central address of the area to be searched among the four search areas is outputted to the next stage.

The address outputted from the comparison circuit 3_2 is inputted to the SRAM 1_3, and the entry data of the 1st word (1stw), the 5th word (5thw), the 9th word (9thw), or the 13th word (13thw) is read and supplied through a register 6_10 to the comparison circuit 3_3. The comparison result and the address outputted from the comparison circuit 3_2 are supplied through the flip-flops 7_3 and 7_4 to the comparison circuit 3_3. FIG. 4 is an explanation diagram showing an operation example of the comparison circuit 3_3. The preceding comparison result "1" indicating the match or "0" indicating the mismatch is inputted to the comparison circuit 3_3, and the address "1", "5", "9", or "13" of the entry data to be compared or the address "3", "7", or "11" of the entry data that has matched the search data (Search Entry) in a preceding stage is inputted to the comparison circuit 3_3.

In the case of the address "1" input from the preceding stage, the entry data of the 1st word (1stw) is read from the SRAM 1_3, and is compared with the search data (Search Entry) by the comparison circuit 3_3. The comparison circuit 3_3 outputs "0" indicating the mismatch and the address "0" in the case of the comparison result "small", outputs "0" indicating the mismatch and the address "2" in the case of the comparison result "large", and outputs "1" indicating the match and the address "1" in the case of the comparison result "match".

In the case of the address "5" input from the preceding stage, the entry data of the 5th word (5thw) is read from the SRAM 1_3, and is compared with the search data (Search Entry) by the comparison circuit 3_3. The comparison circuit 3_3 outputs "0" indicating the mismatch and the address "4" in the case of the comparison result "small", outputs "0" indicating the mismatch and the address "6" in the case of the comparison result "large", and outputs "1" indicating the match and the address "5" in the case of the comparison result "match".

In the case of the address "9" input from the preceding stage, the entry data of the 9th word (9thw) is read from the SRAM 1_3, and is compared with the search data (Search Entry) by the comparison circuit 3_3. The comparison circuit 3_3 outputs "0" indicating the mismatch and the address "8" in the case of the comparison result "small", outputs "0" indicating the mismatch and the address "10" in the case of the comparison result "large", and outputs "1" indicating the match and the address "9" in the case of the comparison result "match".

In the case of the address "13" input from the preceding stage, the entry data of the 13th word (13thw) is read from the SRAM 1_3, and is compared with the search data (Search Entry) by the comparison circuit 3_3. The comparison circuit 3_3 outputs "0" indicating the mismatch and the address "12" in the case of the comparison result "small", outputs "0" indicating the mismatch and the address "14" in the case of the comparison result "large", and outputs "1" indicating the match and the address "13" in the case of the comparison result "match".

In the case of the comparison result "match" and the address "3", "7", or "11" input from the preceding stage, the comparison circuit 3_3 outputs the comparison result "1" indicating "match" and the input address "3", "7", or "11" as they are.

Thus, as a result of the third comparison, the search area is further narrowed to ½, that is, ⅛ of the whole, and the central address of the area to be searched among the eight search areas is outputted to the next stage.

The address outputted from the comparison circuit 3_3 is inputted to the SRAM 1_4, and the entry data of the 2nd word (2ndw), the 4th word (4thw), the 6th word (6thw), the 8th word (8thw), the 10th word (10thw), the 12th word (12thw), or the 14th word (14thw) is read and supplied through a register 6_11 to the comparison circuit 3_4. The comparison result and the address outputted from the comparison circuit 3_3 are supplied through the flip-flops 7_5 and 7_6 to the comparison circuit 3_4. FIG. 5 is an explanation diagram showing an operation example of the comparison circuit 3_4. The preceding comparison result "1" indicating the match or "0" indicating the mismatch is inputted to the comparison circuit 3_4, and the address "0", "2", "4", "6", "8", "10", "12", or "14" of the entry data to be compared is inputted to the comparison circuit 3_4. Or the address "1", "3", "5", "7", "9", "11", or "13" of the entry data that has matched the search data (Search Entry) in a preceding stage is inputted to the comparison circuit 3_4.

In this stage, due to one-word configuration, the search area cannot be narrowed any further. If entry data specified by the address inputted from the preceding stage matches the search data (Search Entry), "1" indicating the match and the address thereof are outputted. If the input from the preceding stage is "match" and the address of the match is inputted, "1" indicating the match and the input address are outputted as they are. At this stage, actually, the comparison of the entry data from the 0th word (0thw) to the 14th word (14thw) with the search data (Search Entry) has been completed.

Figures 6, 7:
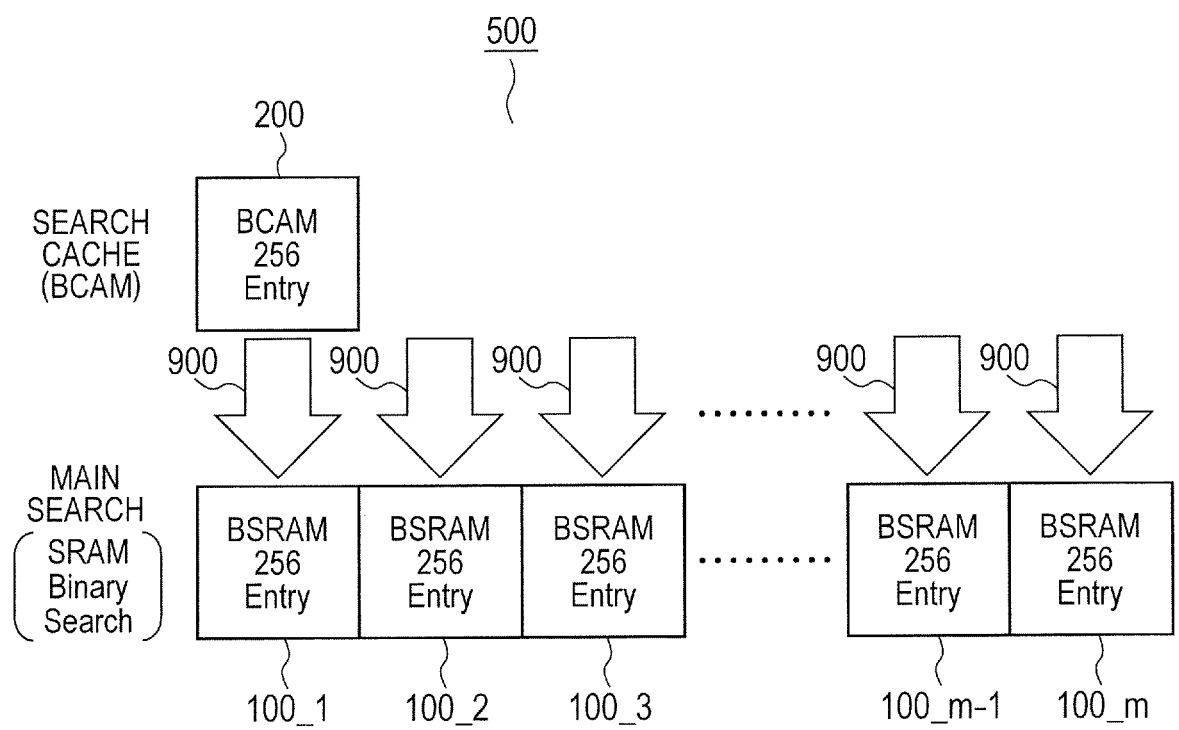
FIG. 6 is an explanation diagram showing an operation example of a comparison circuit 3_5 in the CAM shown in FIG. 1.
FIG. 7 is a block diagram showing a configuration example of a CAM for performing a two-stage search.

FIG. 6 is an explanation diagram showing an operation example of the comparison circuit 3_5. If the output from the preceding comparison circuit 3_4 is "0" indicating the mismatch, the comparison circuit 3_5 compares the entry data of the 15th word (15thw) stored in the SRAM 1_5 with the search data (Search Entry), outputs the address "15" in the case of the match, and outputs "miss hit" indicating mismatch in the end in the case of the mismatch. If the output from the preceding comparison circuit 3_4 is "1" indicating the match, the comparison circuit 3_5 outputs the input address as it is.

Thus, in each stage of the comparison operation by the comparison circuits 3_1 to 3_5, the search area is narrowed to ½; therefore, assuming that the number of entries is $2^N$, the number of comparisons is the binary logarithm $\log_2 2^N = N$. In the BCAM in the related art which compares search data with all entries, the number of comparisons is equal to the number of entries $2^N$; therefore, the number of comparisons in the CAM according to this embodiment can be suppressed to $N/2^N$ that of the BCAM in the related art. Assuming that the power consumption of the content addressable memory (CAM) is roughly proportional to the number of comparisons, the power consumption of the CAM according to this embodiment can be suppressed to $N/2^N$ that of the BCAM in the related art. This is theoretical rough calculation, and has an error according to actual circuit element implementation. For example, in the above example, the number of comparisons is 5 whereas N=4. Since the comparison circuit is configured with ordinary logic circuits, the power consumed by one comparison operation might be larger than that of a comparison circuit in a cell; however, due to the decreased number of comparisons, the total power consumption is suppressed.

Preferably, the CAM according to this embodiment and also other control circuits are formed over a single semiconductor substrate, and integrated into a one-chip LSI (Large Scale Integrated Circuit). Such an LSI is formed over e.g. a silicon substrate, using a known CMOS (Complementary Metal-Oxide-Semiconductor field effect transistor) semiconductor manufacturing technology. The CAM according to this embodiment may be provided as a microcell library in a design environment for designing a system LSI or provided as a compiler that can generate an appropriate microcell by freely specifying the number of bits and the number of entries. This method of providing the CAM applies to the second to sixth embodiments as well as this embodiment.

Second Embodiment

<CAM for Performing Two-Stage Search>

As described above, the CAM (hereinafter abbreviated as BSRAM) for performing the binary search on the SRAM according to the first embodiment brings about a pronounced effect of suppressing the power consumption, on the premise that all entry data is sorted. Accordingly, partial writing such as overwriting old entry data with the latest entry data is not allowed, and there is required an operation for reading, sorting, and rewriting all necessary entry data. On the other hand, the CAM (BCAM) in the related art compares search data with all entry data at the same time, and therefore can freely rewrite entry data (write additional data, overwrite existing data).

In the second embodiment, a BCAM functioning as a search cache is provided before the BSRAM, thereby performing a two-stage search. New entry data is successively written to the BCAM, and when the number of entries of the BSRAM is reached, the entry data is sorted and transferred to the BSRAM. The BCAM is first searched for search data, and then the BSRAM is searched in the case of a mishit of the BCAM. This makes it possible to freely rewrite entry data (write additional data, overwrite existing data) and suppress the power consumption. When the CAM for performing the two-stage search is configured by combining one BCAM and multiple BSRAMs, the effect of suppressing the power consumption becomes more pronounced.

FIG. 7 is a block diagram showing a configuration example of the CAM for performing the two-stage search.

The CAM 500 for performing the two-stage search includes one binary CAM (BCAM) 200 functioning as a search cache and CAMs (BSRAMs) 100_1 to 100_*m* for performing the binary search on m SRAMs functioning as a main search. The BCAM 200 has e.g. 256 entries, compares one input search data with up to 256 pieces of stored entry data at the same time, and outputs an address for storing matched entry data or "miss hit" indicating a mismatch. Each entry of the BCAM 200 has a valid flag, and only valid entry data is subject to search, whereas the result of comparison with invalid entry data is ignored. It is possible to write new entry data to an invalid entry in parallel with a search operation. The BSRAMs 100_1 to 100_*m* each have 256 entries like the BCAM 200, compares one input search data with 256 pieces of stored entry data based on the algorithm described in the first embodiment, and outputs an address for storing matched entry data or "miss hit" indicating a mismatch.

Entry data inputted to the CAM 500 is written to the BCAM 200. When all 256 entries of the BCAM 200 store entry data, that is, the BCAM 200 is full, 256 entries are read from the BCAM 200, sorted, and transferred to one of the BSRAMs 100_1 to 100_*m* (900). All the 256 entries of the BCAM 200 are set to be invalid so that entry data can be written. Further, when new 256 pieces of entry data are written to the BCAM 200, again the 256 entries are read, sorted, and transferred to another one of the BSRAMs 100_1 to 100_*m* (900). Thus, every 256 pieces of entry data written to the BCAM 200 are sorted and sequentially transferred to the BSRAMs 100_1 to 100_*m*. The sort and transfer operation may be performed by a dedicated logic circuit 900 or may be performed by software as one of the tasks of a processor for controlling the CAM 500.

When search data is inputted, the BCAM 200 performs a search. If the BCAM 200 outputs "miss hit", that is, the input search data does not match entry data stored in the BCAM 200, the search data is sent to one of the BSRAMs 100_1 to 100_*m* and undergoes search. As for search order, preferably, the BCAM 200 is searched first, and then the BSRAMs 100_1 to 100_*m* are searched in reverse chronological order of transfer of entry data. The later the entry data is written, the higher the hit probability, which reduces the time to a hit, and by not performing searches after the hit, the power consumption can be reduced.

As described above, a hit in the BCAM 200 functioning as the search cache leads to a small latency, and in the case of no hit in the BCAM 200, the BSRAMs 100_1 to 100_*m* are sequentially searched, thereby making it possible to provide the CAM with a large capacity but low power consumption.

For example, in the case of m=255, the whole of the CAM 500 has a large capacity of 64K (65536) entries. If this is configured with one binary CAM, one search data is compared with 65536 pieces of entry data at the same time, so that the corresponding power is consumed. On the other hand, in the CAM 500 according to the second embodiment, even if all areas of all CAMs (the BCAM 200 and the BSRAMs 100_1 to 100_*m*) are searched, 256 pieces of entry data in the BCAM and 16×255 pieces of entry data in the BSRAMs 100_1 to 100_*m*, that is, a total of 4336 pieces of entry data are compared with one search data, which enables a reduction to about 1/15. If there is a hit in the middle of the search, the subsequent comparisons can be omitted, which enables a further reduction.

While in this embodiment, each CAM has 256 entries and configures the 64K-entry CAM as a whole with m=255, it is possible to arbitrarily change the number of entries and the number (m) of BSRAMs. Further, while the number of entries of the BCAM 200 is the same as that of each BSRAM, the number of entries of the BCAM 200 can be greater than or equal to that of each BSRAM. If the number of entries of the BCAM 200 is greater than that of each BSRAM, it is possible to write new entry data to the BCAM 200 while the BCAM 200 is transferring entry data to the BSRAM.

Third Embodiment

<CAM for Performing Two-Stage Search (Complementary Search Caches)>

Since the CAM 500 shown in FIG. 7 incorporates only one BCAM 200 functioning as the search cache; depending on the configuration of the BCAM 200, the writing of new entry data to the BCAM 200 might be restricted or inhibited while the BCAM 200 transfers entry data to the BSRAM when the BCAM 200 is full. To solve such a problem, the search cache is configured with two BCAMs 200_1 and 200_2 operating in a complementary manner.

Figure 8:
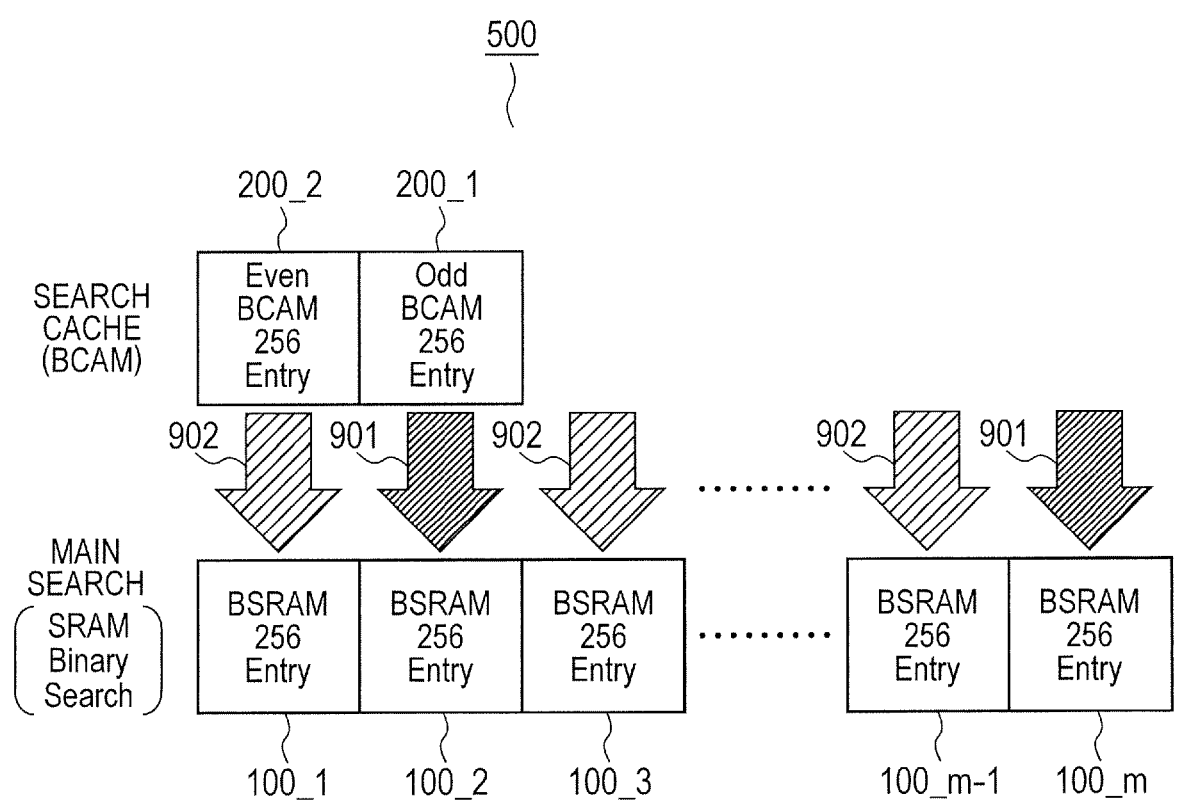
FIG. 8 is a block diagram showing another configuration example of the CAM for performing the two-stage search.

FIG. 8 is a block diagram showing another configuration example of the CAM 500 for performing the two-stage search.

The CAM 500 includes two BCAMs 200_1 and 200_2 functioning as search caches and operating in a complementary manner and the CAMs (BSRAMs) 100_1 to 100_*m* for performing the binary search on m SRAMs functioning as a main search. The BCAMs 200_1 and 200_2 each have e.g. 256 entries, and operate in the same manner as the BCAM 200 according to the second embodiment. Further, the BSRAMs 100_1 to 100_*m* are also the same as the BSRAMs 100_1 to 100_*m* according to the second embodiment.

Entry data inputted to the CAM 500 is written to one of the BCAMs 200_1 and 200_2, for example, the BCAM 200_2. When the BCAM 200_2 becomes full, all entries are read from the BCAM 200_2, sorted, and transferred to one of the BSRAMs 100_1 to 100_*m* (902). During the read/sort/transfer, the BCAM 200_1 is subject to writing of new input entry data. When the BCAM 200_1 becomes full, all entries are read from the BCAM 200_1, sorted, and transferred to one of the BSRAMs 100_1 to 100_*m* (901). During this time, instead the BCAM 200_2 is subject to writing of new input entry data. Thus, input entry data is written to the BCAMs 200_1 and 200_2 in an alternate manner, and is read, sorted, and transferred, which makes it possible to write new entry data without waiting.

In the search operation as well, the BCAMs 200_1 and 200_2 are searched in an alternate manner, and in the case of a mishit of either BCAM, the BSRAMs 100_1 to 100_*m* as the main search is searched. Since the search operation is the same as in the second embodiment, the detailed description thereof is omitted.

Fourth Embodiment

<Search Order>

In the CAM 500 according to the second and third embodiments, the order of search among the BSRAMs 100_1 to 100_*m* as the main search can be changed flexibly. In the case where the CAM is applied to an application system in which entry data is frequently rewritten, it has been found that the later the entry data is written, the higher the hit probability. Accordingly, newly written entry data is subject to search prior to older data, which enables an earlier hit, and control is performed so as not to perform searches after the hit, thereby making it possible to further reduce the power consumption.

FIG. 9 is an explanation diagram showing an operation example of the CAM for performing the two-stage search. BSRAM numbers are shown in the lateral direction, and pipeline stages are shown in the longitudinal direction. To facilitate understanding, the number of BSRAMs m=8, and numbers 0 to 7 are assigned to the BSRAMs. One pipeline stage represents a period for writing to or searching the whole of one BSRAM, and first (1st) to eighth (8th) stages are shown. Symbol "W" denotes an operation for writing entry data, that is, an operation for transferring sorted entry data from the search cache (BCAM 200 or either BCAM 200_1 or BCAM 200_2). Symbols "data 0" to "data 7" denote the execution of the search operation for search data 0 to 7".

Entry data writing "W" proceeds from BSRAM 0 in the 1st stage, BSRAM 1 in the 2nd stage, ..., to BSRAM 7 in the 8th stage, and the writing returns to BSRAM 0 and is repeated (not shown).

In the 1st stage, the BSRAM 0 is subject to writing, and the BSRAM 7 stores the latest entry data written immediately therebefore. Accordingly, the BSRAM 7 is searched first after a mishit of the search cache as to the search data 0. In the case of a mishit of the BSRAM 7 as well, the BSRAM 6 is searched in the 2nd stage. In the case of further mishits, the BSRAM 5 is searched in the 3rd stage, the BSRAM 4 in the 4th stage, the BSRAM 3 in the 5th stage, the BSRAM 2 in the 6th stage, the BSRAM 1 in the 7th stage, and the BSRAM 0 in the 8th stage, in succession. In the above writing order, the later entry data is stored in the BSRAM of the larger number, which is therefore searched earlier.

In the 2nd stage, the BSRAM 1 is subject to writing, and the BSRAM 0 stores the latest entry data written immediately therebefore. Accordingly, the BSRAM 0 is searched first after a mishit of the search cache as to the search data 1, followed by the BSRAM 7, the BSRAM 6, the BSRAM 5, the BSRAM 4, the BSRAM 3, the BSRAM 2, and the BSRAM 1. The same applies to the 3rd and subsequent stages.

In the 5th stage, the BSRAM 4 is subject to writing, and the BSRAM 3 stores the latest entry data written immediately therebefore. Accordingly, the BSRAM 3 is searched first after a mishit of the search cache as to the search data 4. However, in the 5th stage, the BSRAM 3 is to be searched for the search data 0. Thus, two pieces of search data 4 and 0 are inputted to one BSRAM at the same time. The same phenomenon occurs in the BSRAMs 2 and 4 in the 6th stage, the BSRAMs 1, 3, and 5 in the 7th stage, and the BSRAMs 0, 2, 4, and 6 in the 8th stage.

In this case, the following three solutions can be adopted. In the first solution, the search operation is suspended. For example, in the 5th stage, the search operation for the search data 4 or 0 is suspended for solution. In the second solution, the search operation for one search data is aborted. Since entry data in the BSRAM 3 is rewritten in the 4th stage, there might be no point in searching the BSRAM 3 for the data 0 in the 5th stage subsequent to the BSRAM 4 in the 4th stage. In this case, the subsequent searches are aborted with the result of searching for data 0 as "miss hit", thereby solving the problem of the search data conflict. In the third solution, the BSRAM is configured so as to be able to simultaneously and parallelly search for multiple pieces of search data.

Figure 10:
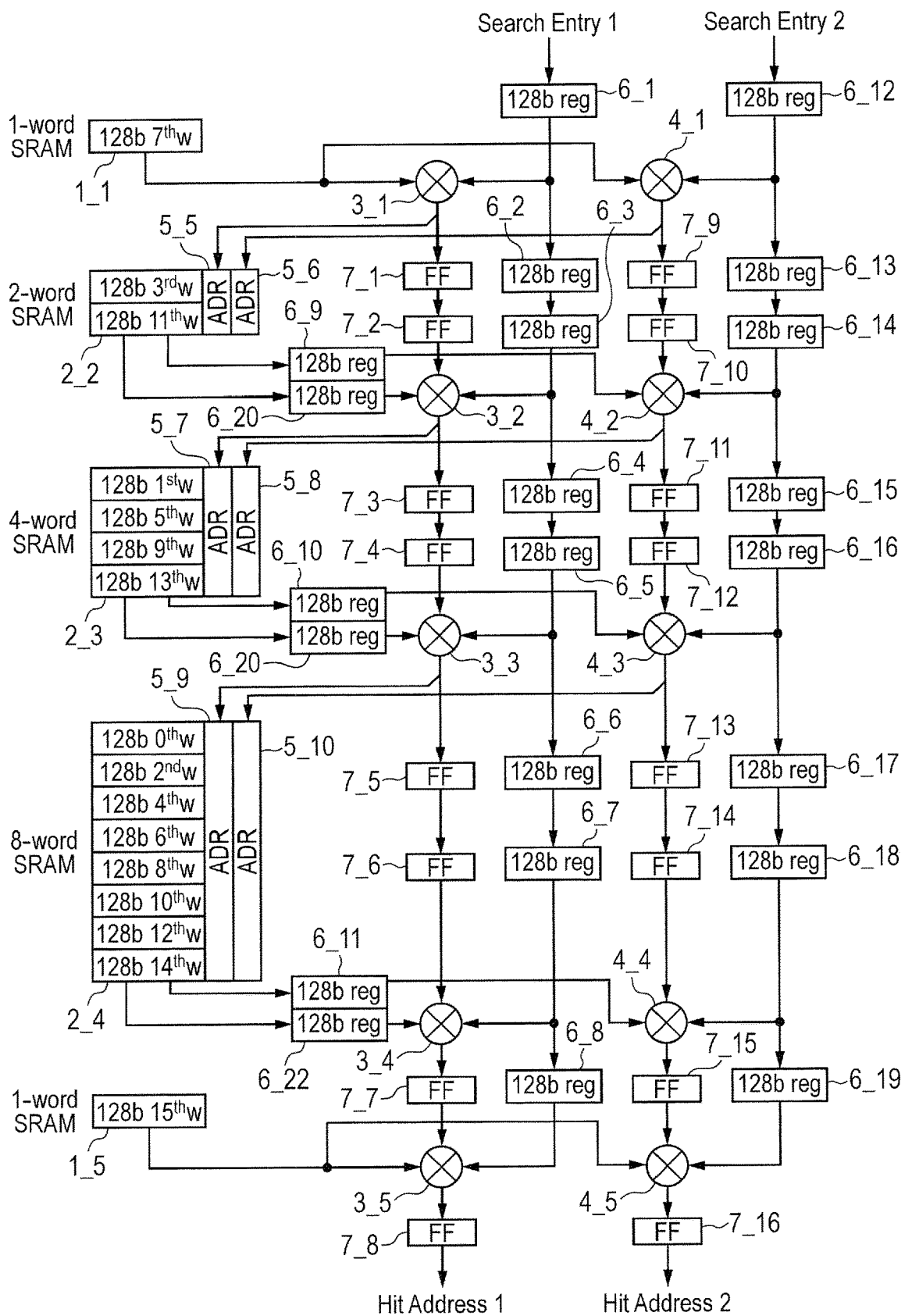
FIG. 10 is a block diagram showing a configuration example of a CAM for performing the binary search for two input search entries.

FIG. 10 is a block diagram showing a configuration example of a CAM for performing the binary search for two input search entries. The CAM shown in FIG. 10 differs from the CAM for performing the binary search on the SRAM shown in FIG. 1 in that the CAM shown in FIG. 10 includes dual-port SRAMs 2_2 to 2_4 in place of the SRAMs 1_2 to 1_4 and further includes comparison circuits 4_1 to 4_5 in addition to the comparison circuits 3_1 to 3_5. Further, registers 6_12 to 6_22 and flip-flops 7_9 to 7_16 configuring a pipeline are provided in parallel. Two pieces of search data Search Entry 1 and Search Entry 2 are simultaneously and parallelly compared with entry data by the comparison circuits 3_1 to 3_5 and the comparison circuits 4_1 to 4_5. Entry data to be compared is read independently from each port of the dual-port SRAMs 2_2 to 2_4. In FIG. 10, each interconnection is comprised of 1 bit or a plurality of bits, but a bus is not shown.

The operation in FIG. 10 is the same as that described in the first embodiment with reference to FIG. 1 except for the parallel operation, and the description thereof is omitted.

Fifth Embodiment

<BCAM with Sort Function>

In the CAM for performing the binary search on the SRAM shown in FIGS. 1 and 10, it is necessary to sort and write entry data, as described above.

Figure 11:
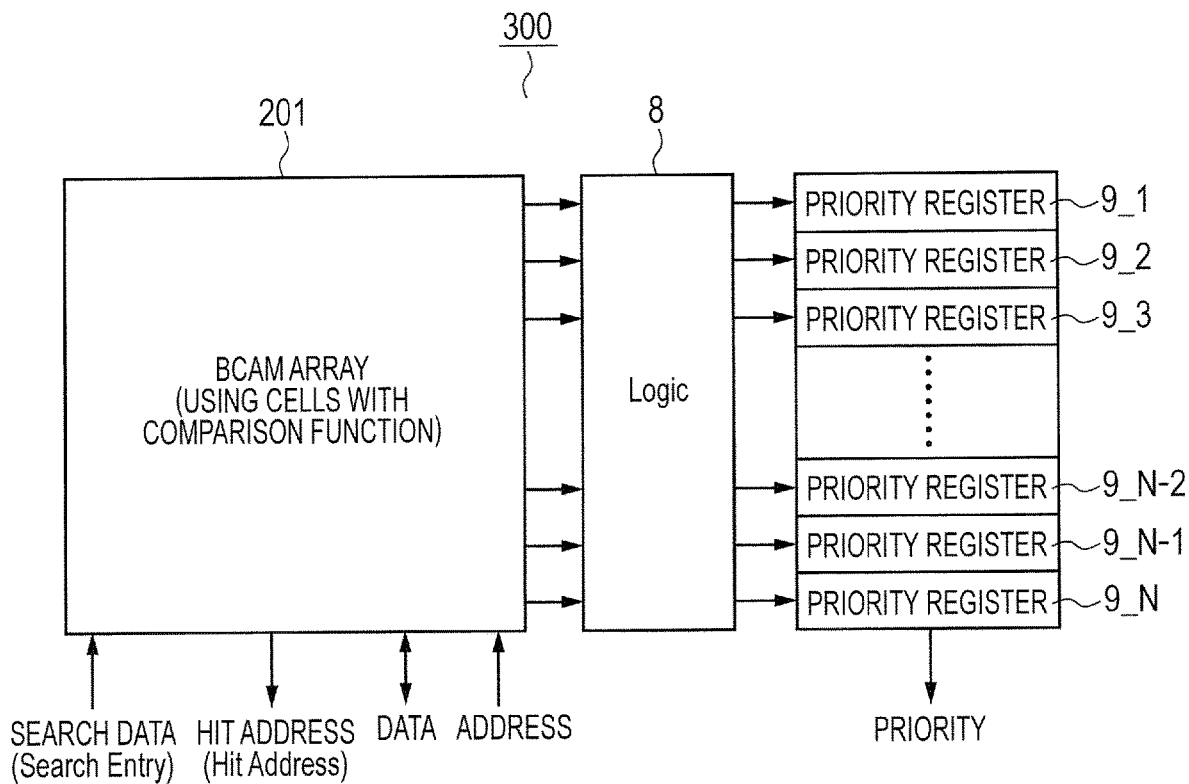
FIG. 11 is a block diagram showing a configuration example of a CAM with a sort function.

FIG. 11 is a block diagram showing a configuration example of a CAM 300 with a sort function. In the CAM for performing the two-stage search shown in FIGS. 7 and 8, the BCAM 200 or the BCAMs 200_1 and 200_2 functioning as search caches are replaced by the CAM 300 with the sort function shown in FIG. 11, thereby simplifying the transfer operations or transfer circuits 900, 901, and 902.

The CAM 300 with the sort function includes a BCAM array 201 using cells with a comparison function which have a match/magnitude comparison function, priority registers 9_1 to 9_N provided corresponding to the respective entries, and a logic circuit (Logic) 8 for writing appropriate values to the priority registers 9_1 to 9_N based on comparison results by the cells with the comparison function. In the BCAM array 201, it is possible to input an address and read/write data (RAM mode) as in an ordinary memory, and it is possible to input search data (Search Entry) and output an address for storing matched entry data as a hit address (CAM mode).

The CAM 300 with the sort function appropriately updates all priorities stored in the priority registers 9_1 to 9_N every time new entry data is written. When new entry data is inputted, the BCAM array 201 using cells with the comparison function compares the new input entry data with entry data stored in each entry in the BCAM array 201, and outputs a match/magnitude comparison result for each entry. The logic circuit (Logic) 8 appropriately updates all priorities stored in the priority registers 9_1 to 9_N, based on the comparison result for each entry. While an example of "the operation of the CAM 300 with the sort function" will be described, an algorithm for updating priorities is not limited thereto.

In FIG. 11, each interconnection is comprised of a plurality of bits, but a bus is not shown. The cell shown in FIG. 14 or 16 or the cell described in Patent Document 1 for example can be used as the cell with the comparison function which has the match/magnitude comparison function. Although the detailed configuration and operation thereof will be described later, values stored in each entry are compared with values inputted from the search entry, and match/magnitude relations are outputted simultaneously in parallel.

The operation of the CAM 300 with the sort function will be described.

All entry data and the values of the corresponding priority registers 9_1 to 9_N are initialized to zero.

Data subject to writing undergoes match/magnitude comparison with all other entry data, regardless of whether the entry data has already been written.

As for an entry not subject to writing, if the data subject to writing is smaller than entry data stored in the entry not subject to writing, the priority of the corresponding priority register is incremented by 1 (add +1). Further, if the priority of the entry not subject to writing is larger than the former priority of an entry subject to writing, the priority of the entry not subject to writing is decremented by 1 (add −1). As for the priority of the entry subject to writing, the number of comparison results "large" that the data subject to writing is larger than entry data for each entry is written as the priority to the priority register.

Thereby, every time entry data is written, the priorities of all entries are appropriately updated, so that the correct priorities are always maintained.

In the above algorithm, the entry data of the same value is assigned the same priority. On the other hand, if the number of comparison results "match and large" that the data subject to writing is equal to or larger than entry data for each entry is substituted for the number of comparison results "large" that the data subject to writing is larger than entry data for each entry, and is written as the priority of the entry subject to writing to the corresponding priority register, the entry data of the same value can be assigned a different priority. Thus, various changes can be made to the priority update algorithm performed by the logic circuit (Logic) 8.

Figure 12:
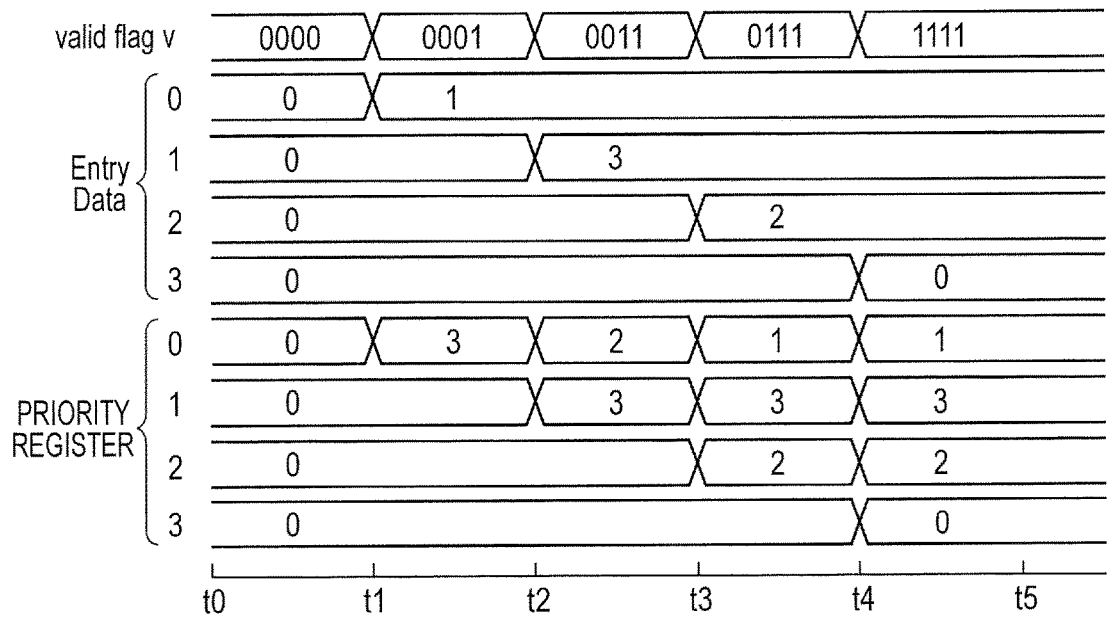
FIG. 12 is a timing chart showing an operation example of the CAM with the sort function.

FIG. 12 is a timing chart showing an operation example of the CAM with the sort function. In FIG. 12, the number of entries is four to facilitate understanding. The horizontal axis indicates the time. In the vertical direction, the valid flag of each entry, entry data, and the values of the priority registers are shown in order from the top.

At time t0, all entry data and priorities are initialized to zero.

At time t1, data "1" is written to the entry 0. The results of comparison with entries not subject to writing are all the result "large"; therefore, the number of comparison results "large" is "3", which is written to the priority register 0.

At time t2, data "3" is written to the entry 1. The results of comparison with entries not subject to writing are all the result "large"; therefore, the number of comparison results "large" is "3", which is written to the priority register 1. As for the entry 0 not subject to writing, the former priority "3" of the entry 0 not subject to writing which is the value of the priority register 0 is larger than the former priority "0" of the entry 1 subject to writing; accordingly, the value of the priority register 0 is decremented by 1 and becomes "2".

At time t3, data "2" is written to the entry 2. The results of comparison with entries not subject to writing are the result "large" in comparison with the entries 0 and 3 and the result "small" in comparison with the entry 1; therefore, the number of comparison results "large" is "2", which is written to the priority register 2. As for the entry 0 not subject to writing, the former priority "2" of the entry 0 not subject to writing which is the value of the priority register 0 is larger than the former priority "0" of the entry 2 subject to writing; accordingly, the value of the priority register 0 is decremented by 1 and becomes "1". As for the entry 1 not subject to writing, the value of the corresponding priority register 1 is incremented by 1 (add +1) and decremented by 1 (add −1), thus canceling each other out, so that the value of the priority register 1 remains at "3". This is because the data "2" subject to writing is smaller than the entry data "3" stored in the entry not subject to writing; accordingly, the priority of the corresponding priority register 1 is incremented by 1 (add +1), whereas the former priority "3" of the entry 1 not subject to writing which is the value of the priority register 1 is larger than the former priority "0" of the entry 2 subject to writing; accordingly, the value of the priority register 1 is decremented by 1 (add −1).

At time t4, data "0" is written to the entry 3. The results of comparison with entries not subject to writing are the result "small" in comparison with the entries 0 to 2; therefore, the number of comparison results "large" is "0", which is written to the priority register 3. As for the entries 0, 1, 2 not subject to writing, the priorities of the corresponding priority registers 0, 1, 2 are incremented by 1 (add +1) and decremented by 1 (add −1), thus canceling each other out, so that the values of the priority registers 0, 1, 2 remain at "1", "3", "2". This is because the data "0" subject to writing is smaller than the entry data "1", "3", "2" stored in the entries not subject to writing; accordingly, the values of the corresponding priority registers 0, 1, 2 are incremented by 1, whereas the former priorities "1", "3", "2" of the entries 0, 1, 2 not subject to writing are larger than the former priority "0" of the entry 3 subject to writing; accordingly, the values of the priority registers 0, 1, 2 are decremented by 1.

Thus, every time new entry data is written, the priorities of all entries are appropriately updated, so that the correct priorities are always maintained.

Figure 13:
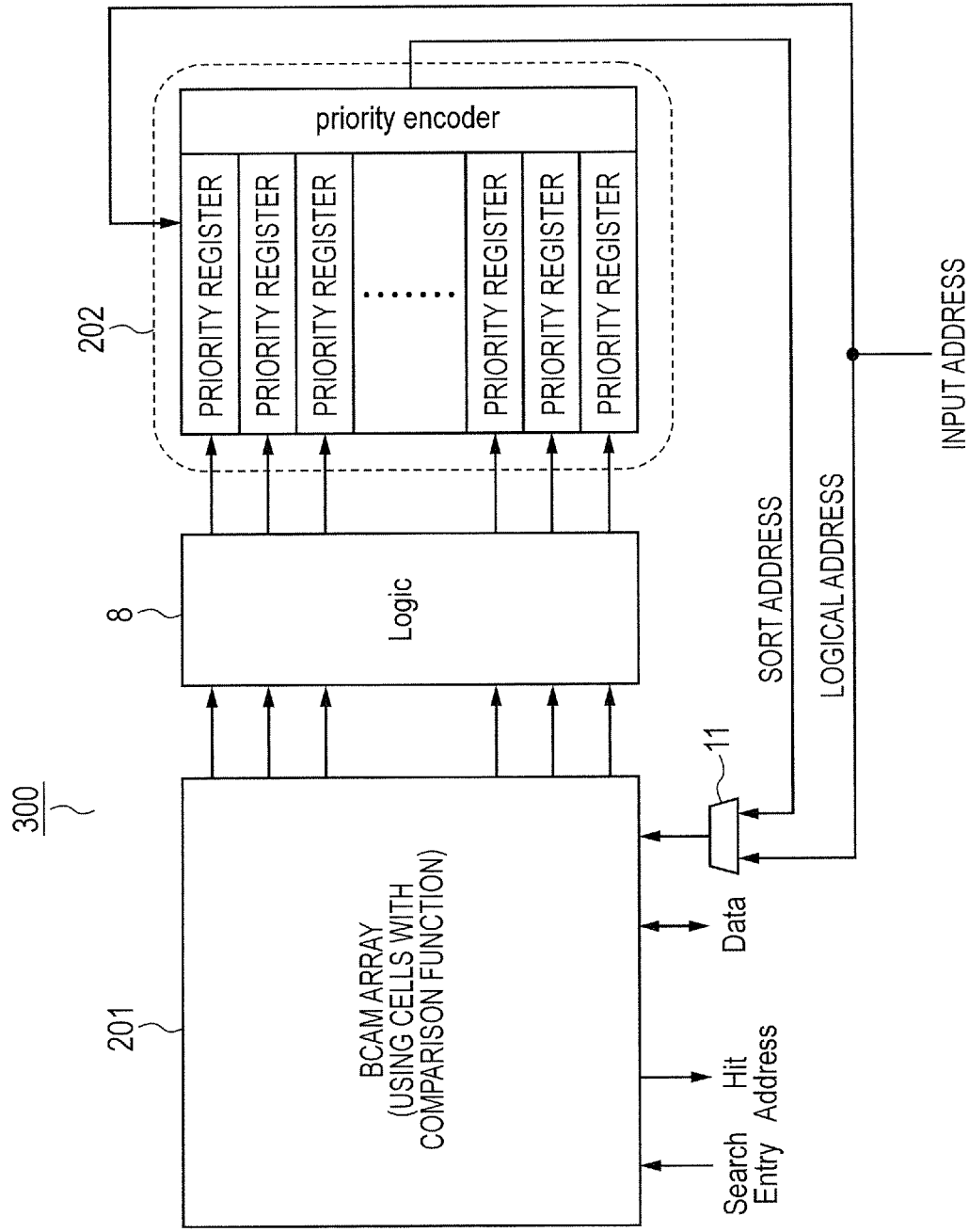
FIG. 13 is a block diagram showing another configuration example of the CAM with the sort function.

FIG. 13 is a block diagram showing another configuration example of the CAM 300 with the sort function. Unlike the CAM shown in FIG. 11, the priority registers 9_1 to 9_N are configured by a CAM 202, and a priority can be inputted to search for the address thereof. The address input to the BCAM array 201 is configured including a selector 11 for selectively switching between a sort address outputted from the CAM 202 functioning as the priority registers and a logical address inputted from the outside. By inputting priorities in order through the input address, the BCAM array 201 outputs the entry corresponding to the priority.

In the CAM 300 with the sort function shown in FIG. 11, priority values are successively outputted from the priority registers 9_1 to 9_N, and the entry data of the corresponding entry is successively read from the BCAM 201 in RAM mode, so that the entry data and the corresponding priority are read. With the priority as an address of the BSRAM, the corresponding entry data is written to an entry in the BSRAM, so that the sorted entry data can be written to the BSRAM.

In the CAM 300 with the sort function shown in FIG. 13, it is possible to read the corresponding entry data from the BCAM 201 in the order specified by successively inputting priorities to the input address, which does not require the BSRAM to have a configuration enabling random access in writing the entry data. Further, the CAM 300 with the sort function shown in FIG. 13 can specify the priority in a random manner and read the corresponding entry, and therefore can also be applied to other than the search cache in CAM 500 for performing the two-stage search according to the second and third embodiments.

The configuration and operation of the cell with the comparison function which has the match/magnitude comparison function will be described.

Figures 14, 15:
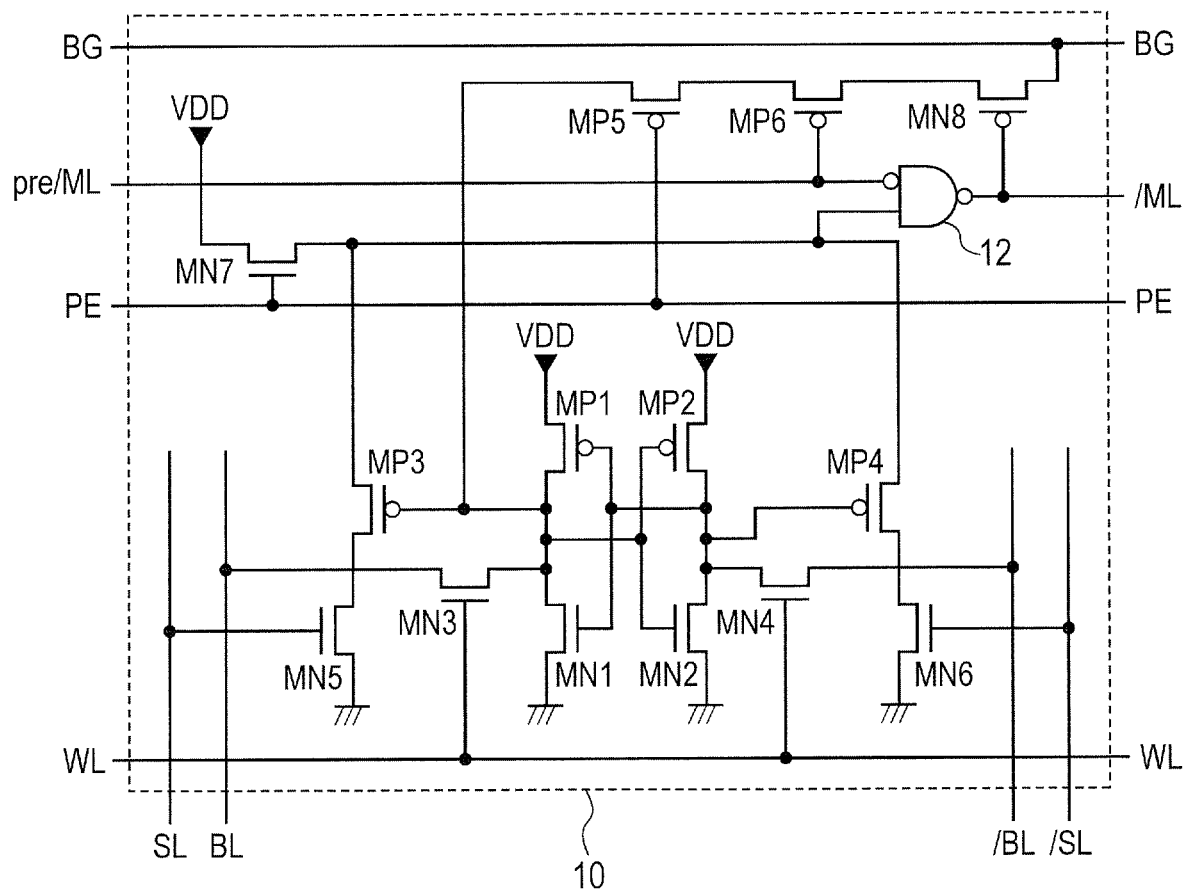
FIG. 14 is a circuit diagram showing a configuration example of a memory cell applicable to the CAM with the sort function.
FIG. 15 is an explanation diagram showing a truth table representing the operation of the memory cell shown in FIG. 14.

FIG. 14 is a circuit diagram showing a configuration example of a memory cell 10 applicable to the CAM with the sort function. FIG. 15 is an explanation diagram showing a truth table representing the operation of the memory cell.

In the memory cell 10, an inverter comprised of an N-channel transistor MN1 and a P-channel transistor MP1 and an inverter comprised of an N-channel transistor MN2 and a P-channel transistor MP2 are coupled at each output to the other input, thereby configuring a storage cell. The output of the inverter comprised of the transistors MN1 and MP1 is coupled to a bit line BL through a transistor MN3 controlled by a word line WL, and the output of the inverter comprised of the transistors MN2 and MP2 is coupled to an inverted bit line /BL through a transistor MN4 controlled by the word line WL. The lines BL and /BL are opposite in logical polarity to each other, and configure a complementary bit line pair. While logical inversion is originally represented by an "overbar" shown over a signal line name, "/" (slash) is used instead, due to restrictions on fonts that can be used in the specification. One bit of search data (Search Entry) is inputted to a complementary search data line pair SL and /SL. The line SL is coupled to the gate of the transistor MN5, and the line /SL is coupled to the gate of the transistor MN6. The gate of a transistor MP3 is coupled to the output of the inverter comprised of the transistors MN1 and MP1, the gate of a transistor MP4 is coupled to the output of the inverter comprised of the transistors MN2 and MP2, and both the drains of the transistors MP3 and MP4 are inputted to the non-inverting input terminal of a combinational logic gate 12. The non-inverting input terminal of the combinational logic gate 12 is precharged to a voltage VDD through a transistor MN7 controlled by a precharge enable signal PE, and a discharge path through the transistors MP3 and MN5 or the transistors MP4 and MN6 is formed. The non-inverting input terminal of the combinational logic gate 12 is discharged and becomes a low level if either the transistors MP3 and MN5 or the transistors MP4 and MN6 are turned on, in the case of a mismatch between stored data and the search data. The output of the combinational logic gate 12 is the inversion logic /ML of a match line ML indicating "match", and a match line pre/ML from an adjacent cell on the higher-order bit side is inputted to the inverting input terminal of the combinational logic gate 12. If the match line pre/ML inputted from the higher-order bit side is low, "match" has been detected in all bits higher than the cell 10, and if "match" is also detected in the cell 10, the low is outputted from the match line /ML.

A magnitude determination line BG outputs a high "1" if the data stored in the cell 10 is larger than the search data, outputs the low "0" if the stored data is smaller than the search data, and outputs high impedance (HiZ) if the stored data matches the search data. The magnitude determination line BG is shared among a plurality of cells 10 configuring the same entry, and the stored entry bit data is outputted through the transistors MP5, MP6, and MN8 in the cell 10 of the first mismatch in sequential comparisons from the highest-order bit. This enables the magnitude comparison of multiple bits of entry data.

Figure 16:
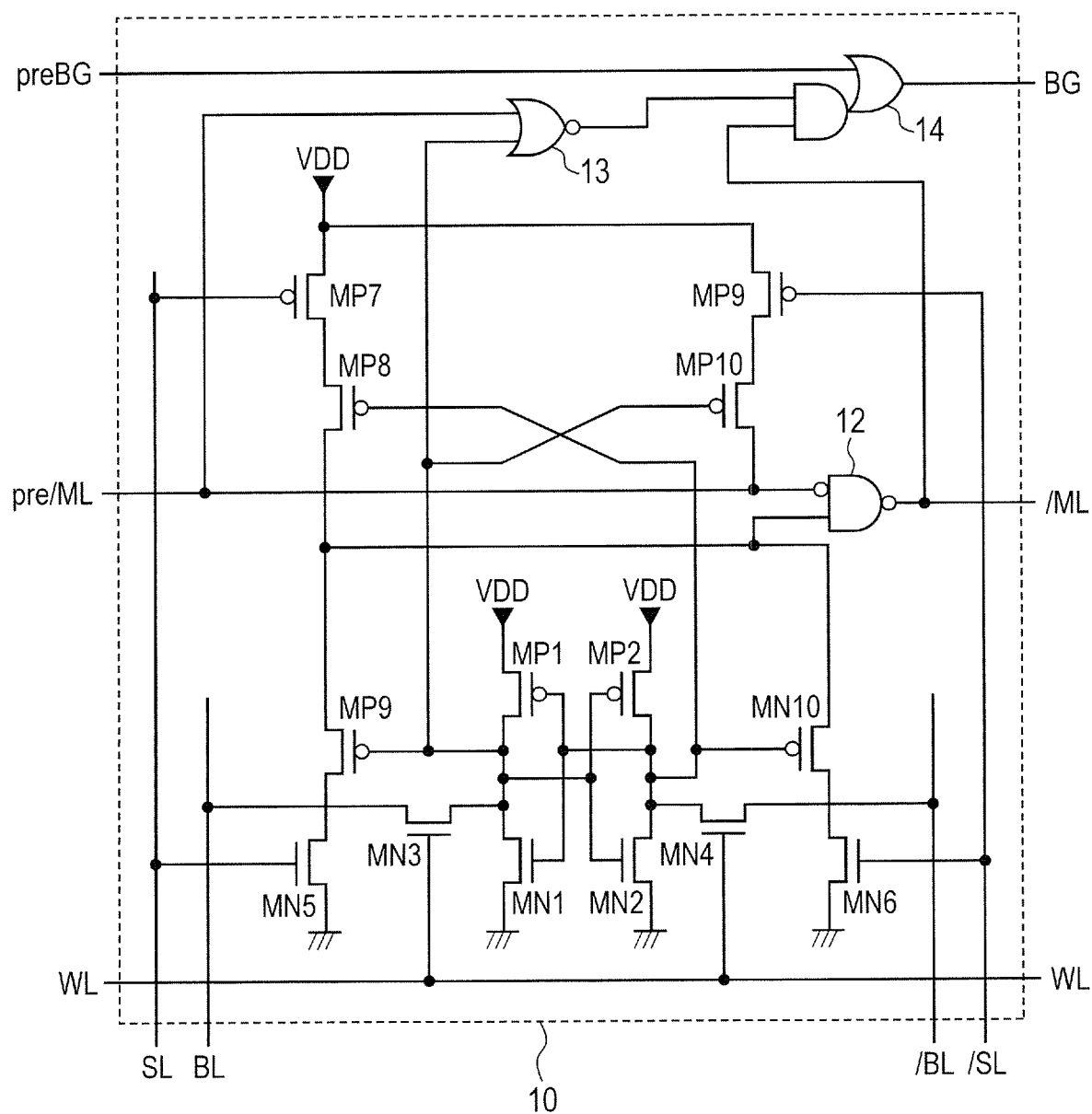
FIG. 16 is a circuit diagram showing another configuration example of the memory cell applicable to the CAM with the sort function.
Figures 17, 18:
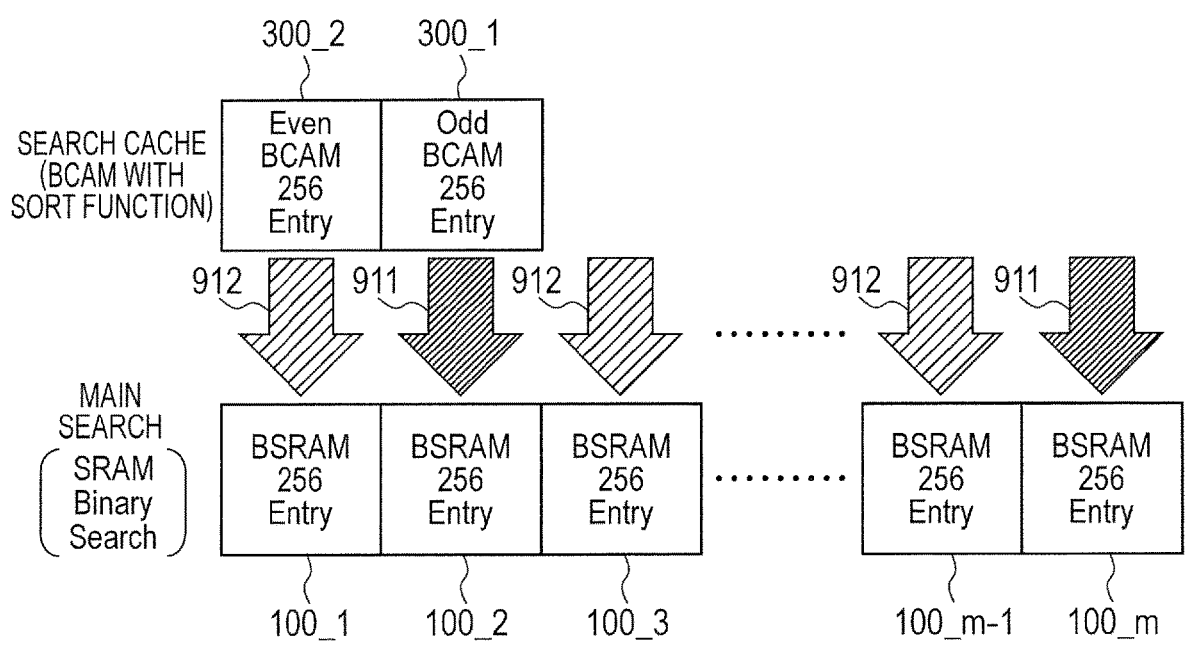
FIG. 17 is an explanation diagram showing a truth table representing the operation of the memory cell shown in FIG. 16.
FIG. 18 is a block diagram showing a configuration example of the CAM for performing the two-stage search, including a plurality of BSRAMs and complementary search caches configured with BCAMs with the sort function.

FIG. 16 is a circuit diagram showing another configuration example of the memory cell 10 applicable to the CAM with the sort function. FIG. 17 is an explanation diagram showing a truth table representing the operation of the memory cell. While the circuit shown in FIG. 14 is a dynamic circuit, the circuit shown in FIG. 16 is a fully static circuit. Accordingly, the precharge enable signal PE is not necessary. As for BG indicating the magnitude comparison result, preBG is inputted from the adjacent cell, and BG is outputted to the subsequent stage. Transistors MP7 to MP9 are provided in place of the transistor MN7 for precharge control, and combinational logic gates 13 and 14 are provided in place of the transistors MP5, MP6, MN8; however, implemented logic is the same as in the cell 10 shown in FIG. 14.

The cells with the comparison function which have the match/magnitude comparison function and are used in the BCAM 201 shown in FIGS. 11 and 13 can compare values stored in each entry with values inputted from the search entry, and determine and output match/magnitude relations in parallel. The invention is not limited to the cells shown in FIGS. 14 and 16, and may use another circuit configuration, such as the cell described in Patent Document 1.

Sixth Embodiment

<CAM with High Throughput and Low Power Consumption>

FIG. 18 is a block diagram showing a configuration example of the CAM for performing the two-stage search, including a plurality of BSRAMs and complementary search caches configured with BCAMs with the sort function.

The CAM 500 includes two BCAMs 300_1 and 300_2 functioning as search caches and operating in a complementary manner and the CAMs (BSRAMs) 100_1 to 100_m for performing the binary search on m SRAMs functioning as a main search. The BCAMs 300_1 and 300_2 each are the BCAM with the sort function described in the fifth embodiment and have e.g. 256 entries.

Entry data inputted to the CAM 500 is written to the BCAMs 300_1 and 300_2 in an alternate manner, and is read, sorted, and transferred, which makes it possible to write new entry data without waiting, as in the third embodiment. Since the BCAMs 300_1 and 300_2 are the BCAMs with the sort function, it is possible to read entry data in sorted order or together with the corresponding priority as described in the fifth embodiment, which can eliminate or greatly simplify the sort function in the transfer operations or transfer circuits 911 and 912 to the BSRAMs 100_1 to 100_m.

In the search operation, the BCAMs 300_1 and 300_2 are searched in an alternate manner, and in the case of a mishit of either BCAM, the BSRAMs 100_1 to 100_m as the main search is searched. Since the search operation is the same as in the second embodiment, the detailed description thereof is omitted.

Thereby, it is possible to provide the CAM that can ensure compatibility between high throughput and low power consumption.

While the invention made above by the present inventors has been described specifically based on the illustrated embodiments, the present invention is not limited thereto. It is needless to say that various changes and modifications can be made thereto without departing from the spirit and scope of the invention.

For example, the memory configuring the BSRAMs 100_1 to 100_m has been described by way of example of the SRAM, but is not limited to the SRAM. For example, the memory may be a RAM using another storage element. Further, in a system having fixed entry data, the memory may be an electrically erasable ROM (Read Only Memory) or a non-erasable ROM.

What is claimed is:

1. A content addressable memory comprising:
a memory to which search data is inputted and which stores multiple pieces of entry data; and
a search circuit for searching for an address in the memory which stores entry data that matches the search data,
wherein, in the memory, the multiple pieces of entry data are sorted in ascending or descending order and can be stored associated with addresses,
wherein, with whole addresses for storing the multiple pieces of entry data as an initial search area, the search circuit repeatedly performs a search operation for comparing entry data stored in a central address of the search area with the search data, outputting the central address as a search result in a case of a match, and narrowing the search area based on a magnitude comparison result in a case of a mismatch, wherein a first content addressable memory has the same configuration as the content addressable memory, the content addressable memory further comprising:
a second content addressable memory having the same number of entries as the first content addressable memory;
a plurality of first content addressable memories; and
a transfer circuit for reading multiple pieces of entry data from the second content addressable memory, sorting the multiple pieces of entry data in ascending or descending order, and transferring the sorted multiple pieces of entry data to the first content addressable memory, and wherein when the search data is inputted, the second content addressable memory is searched first, and in a case of no hit in the second content addressable memory, the first content addressable memories are searched in reverse chronological order of writing of entry data.

2. The content addressable memory according to claim 1, comprising two second content addressable memories,
wherein when one transfers entry data to the first content addressable memory, the other is subject to writing of new entry data.

3. The content addressable memory according to claim 1,
wherein the second content addressable memory is comprised of a memory cell having a match/magnitude comparison function, and further has a priority storage circuit for obtaining and storing priorities corresponding to multiple pieces of input entry data, based on a result of comparing input entry data with each entry data that has been inputted, and
wherein the transfer circuit reads the multiple pieces of entry data in association with the priorities, sorts the multiple pieces of entry data, and transfers the sorted multiple pieces of entry data to the first content addressable memory.

4. A content addressable memory which can store (2 to the Nth power) pieces of entry data (N is a natural number) and searches for entry data that matches input search data, the content addressable memory comprising:
first to Nth memories each having power-of-two words ranging from one word to 2 to the (N−1)th power;
an (N+1)th memory of one word; and
first to (N+1)th comparison circuits provided corresponding to the first to (N+1)th memories,
wherein the first comparison circuit reads entry data from the first memory, performs a match/magnitude comparison with the search data, and outputs a comparison result to the second comparison circuit,
wherein the second comparison circuit reads entry data stored in an address of the second memory calculated based on the comparison result inputted from the first comparison circuit, performs a match/magnitude comparison with the search data, and outputs a comparison result to the third comparison circuit,
wherein the third to Nth comparison circuits determine an address for reading entry data to be compared, based on an address for storing entry data compared by a comparison circuit in a preceding stage and a comparison result inputted from the preceding stage, read entry data from a corresponding memory, perform a match/magnitude comparison with the search data, and output a comparison result to a comparison circuit in a subsequent stage,
wherein the (N+1)th comparison circuit performs a comparison as to whether or not the search data matches entry data stored in the (N+1)th memory, and if there exists entry data that matches the search data, based on a number of a memory that stores the matched entry data and an address in the memory that stores the matched entry data, the (N+1)th comparison circuit calculates and outputs what number entry data matches the search data in a state where the (2 to the Nth power) pieces of entry data are sorted,
wherein the first memory stores (2 to the (N−1)th power) th piece of entry data out of the (2 to the Nth power) pieces of entry data,
wherein the (N+1)th memory stores (2 to the Nth power) th piece of entry data out of the (2 to the Nth power) pieces of entry data,
wherein the ith memory (i is a natural number equal to or greater than 2 and less than N) stores entry data, other than entry data stored in the first to (i−1)th memories, out of (j×2 to the (N−i)th power)th entry data (j is all natural numbers less than 2 to the ith power),
wherein if there exists entry data that matches the search data, (j×2 to the (N−i)th power−1) corresponding to the matched entry data is outputted,
wherein a first content addressable memory has the same configuration as the content addressable memory, the content addressable memory further comprising:
a second content addressable memory having the same number of entries as the first content addressable memory;
a plurality of first content addressable memories; and
a transfer circuit for reading multiple pieces of entry data from the second content addressable memory, sorting the multiple pieces of entry data in ascending or descending order, and transferring the sorted multiple pieces of entry data to the first content addressable memory, and
wherein when the search data is inputted, the second content addressable memory is searched first, and in a case of no hit in the second content addressable memory, the first content addressable memories are searched in reverse chronological order of writing of entry data.

5. The content addressable memory according to claim 4, comprising two second content addressable memories,
wherein when one transfers entry data to the first content addressable memory, the other is subject to writing of new entry data.

6. The content addressable memory according to claim 4,
wherein the second content addressable memory is comprised of a memory cell having a match/magnitude comparison function, and further has a priority storage circuit for obtaining and storing priorities corresponding to multiple pieces of input entry data, based on a result of comparing input entry data with each entry data that has been inputted, and
wherein the transfer circuit reads the multiple pieces of entry data in association with the priorities, sorts the multiple pieces of entry data, and transfers the sorted multiple pieces of entry data to the first content addressable memory.

* * * * *